United States Patent [19]

Cuiper et al.

[11] 4,161,367

[45] Jul. 17, 1979

[54] METHOD AND APPARATUS FOR COMPLETING DIVERLESS SUBSEA FLOWLINE CONNECTIONS

[75] Inventors: Glen H. Cuiper, Spring; Thomas J. Ames, Houston, both of Tex.

[73] Assignee: FMC Corporation, San Jose, Calif.

[21] Appl. No.: 877,924

[22] Filed: Feb. 15, 1978

[51] Int. Cl.² .................... E21B 43/01; F16L 1/00
[52] U.S. Cl. .................... 405/169; 405/173; 166/343; 166/347
[58] Field of Search .................... 61/110, 111, 69 R; 166/0.6, 343, 347; 285/18, 24; 175/7; 405/169, 158, 173

[56] References Cited

U.S. PATENT DOCUMENTS

| | | | |
|---|---|---|---|
| 3,604,731 | 9/1971 | Petersen | 166/0.6 |
| 3,973,625 | 8/1976 | Baugh | 166/0.6 |
| 3,982,776 | 9/1976 | Payne | 61/110 |

*Primary Examiner*—Jacob Shapiro
*Attorney, Agent, or Firm*—L. B. Guernsey; W. W. Ritt, Jr.; J. F. Verhoeven

[57] ABSTRACT

A diverless subsea flowline connection system includes connectors for remotely connecting the ends of a first bundle of flowlines to the ends of a second bundle of flowlines and guidance components which direct the end portions of the first bundle of flowlines into precise connecting alignment with the end portions of the second bundle of flowlines without damage to the connecting seals. The ends of the first bundle are covered and sealed so that the flowlines can be pulled across the seafloor without damage to the ends of the flowlines. Means are provided for pulling the first bundle toward an alignment structure so that the lines can approach the structure from a wide variety of angles and the structure will guide the first bundle into exact alignment with the second bundle. This pulling means includes means for connecting a pulling cable to the radial center of a pulling head attached to the ends of the first bundle of flowlines. The ends of the flowlines are connected together and aligned before the fluid-tight seals are set to prevent possible damage to the seals. After the flowline ends are precisely aligned the seals are set. If desired, the connecting seals can be replaced by remote control. The pulling, aligning, replacement of seals and fluid-tight connecting of the flowlines is all done by remote control from the surface of the sea.

33 Claims, 19 Drawing Figures

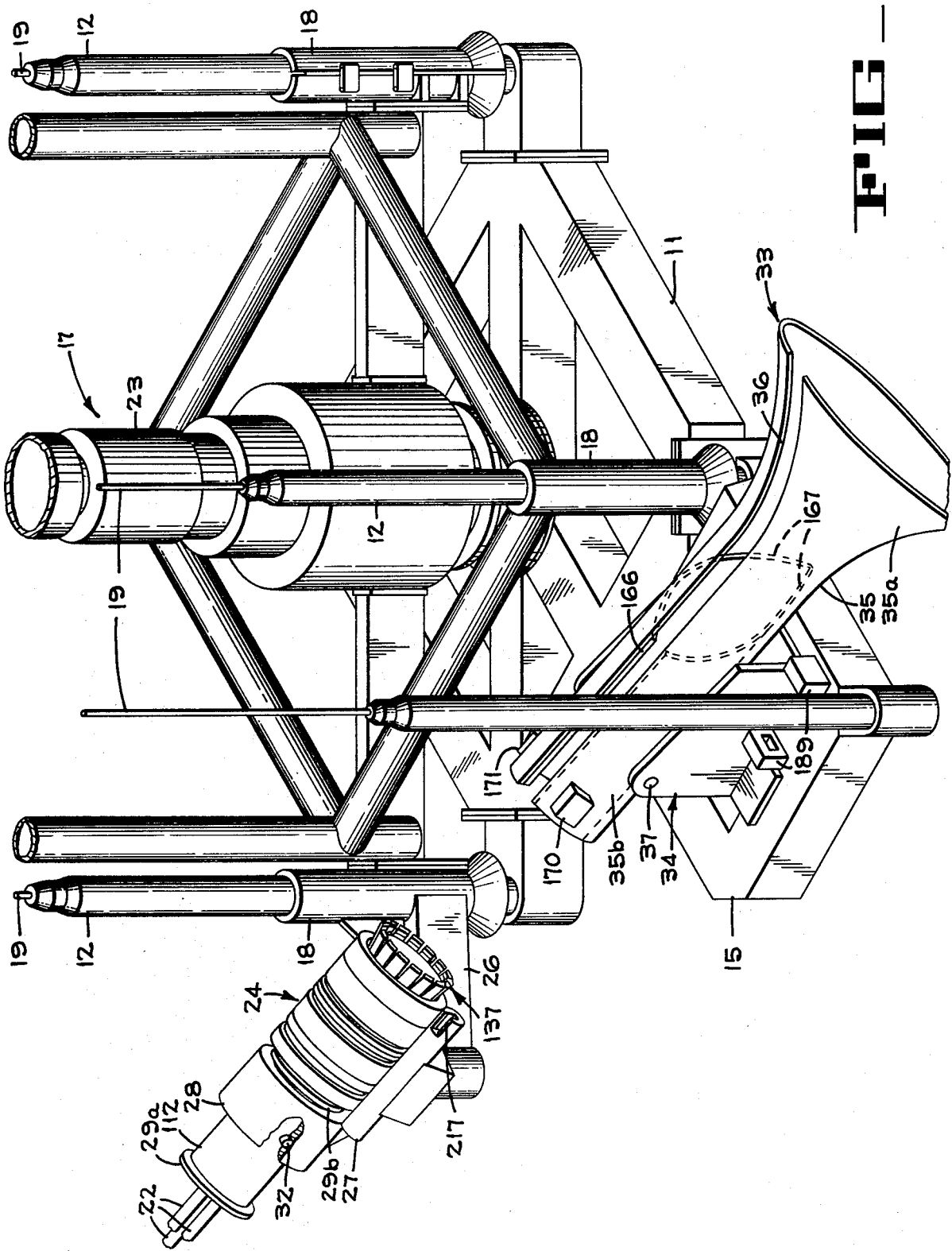

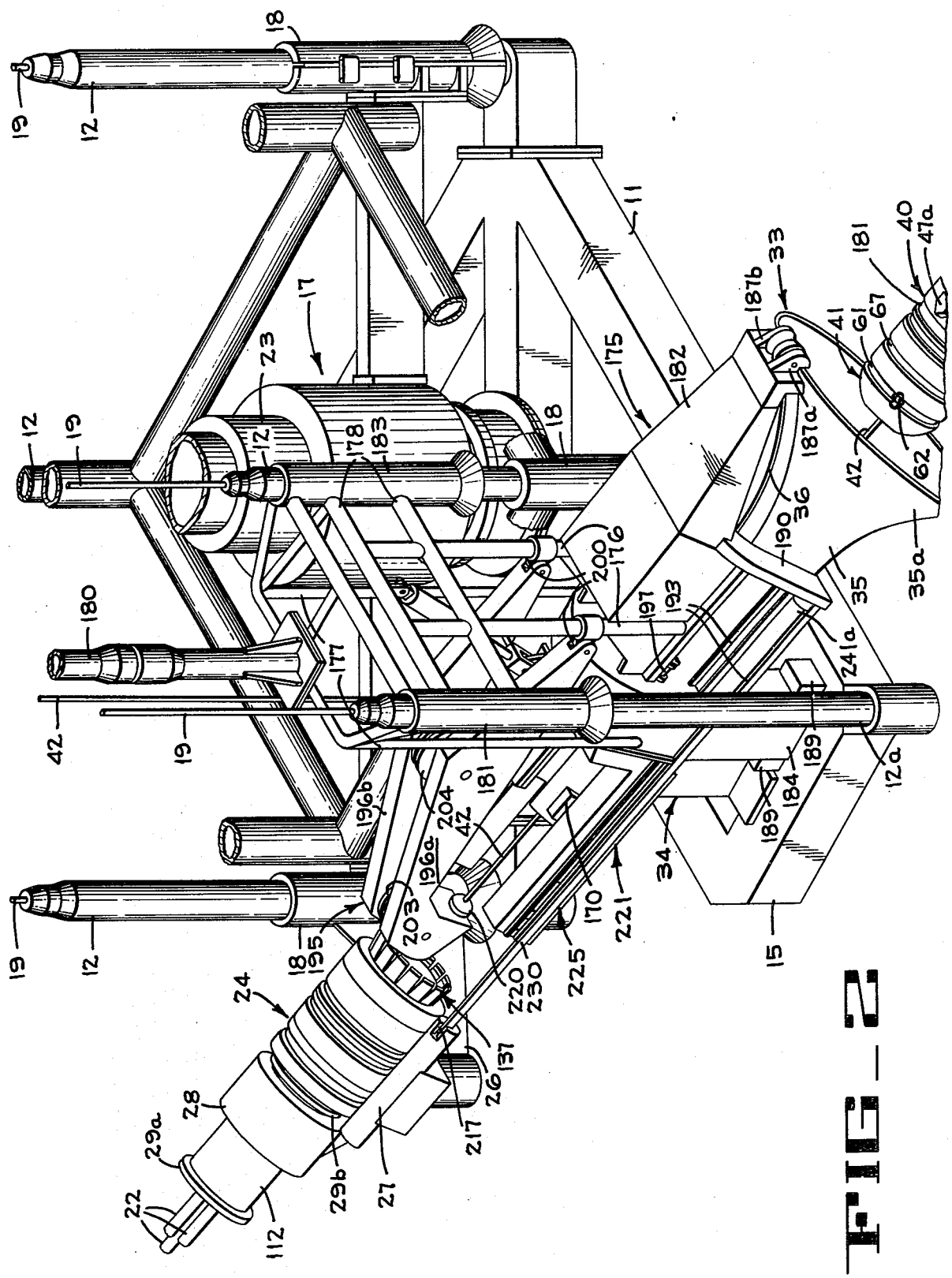

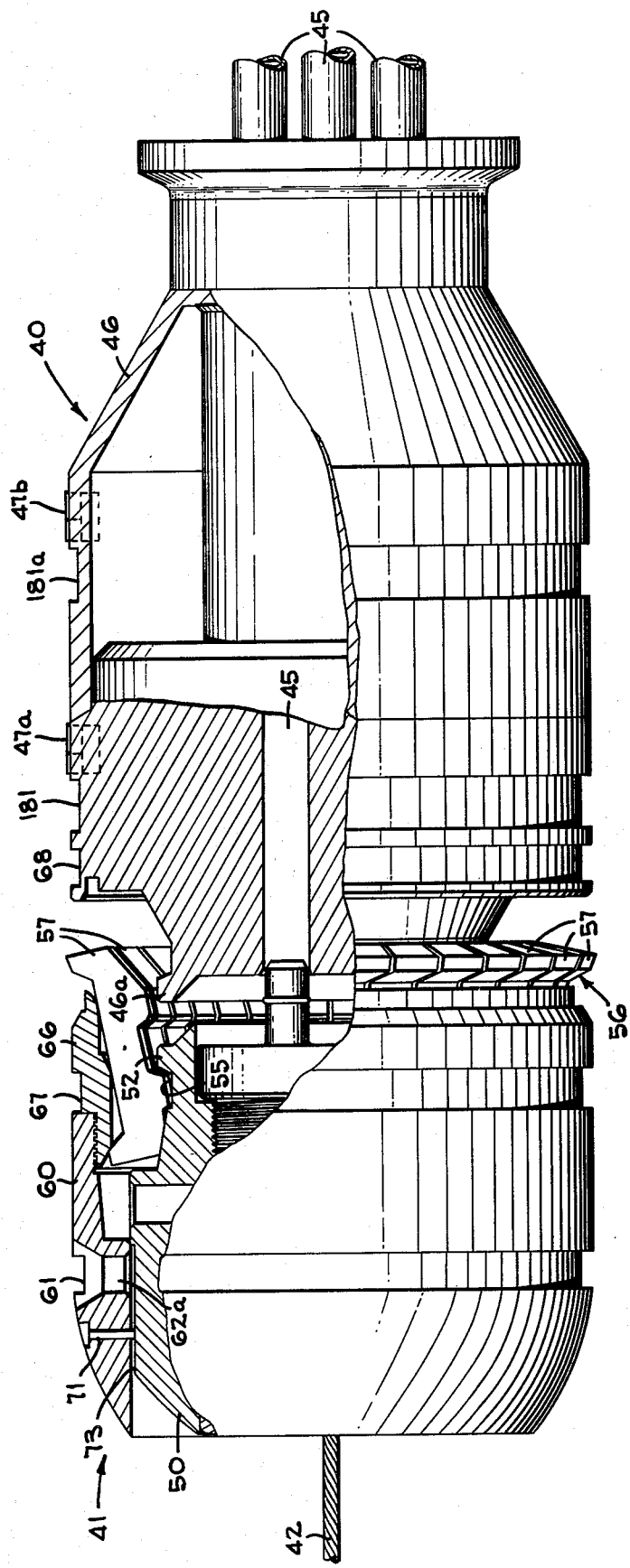

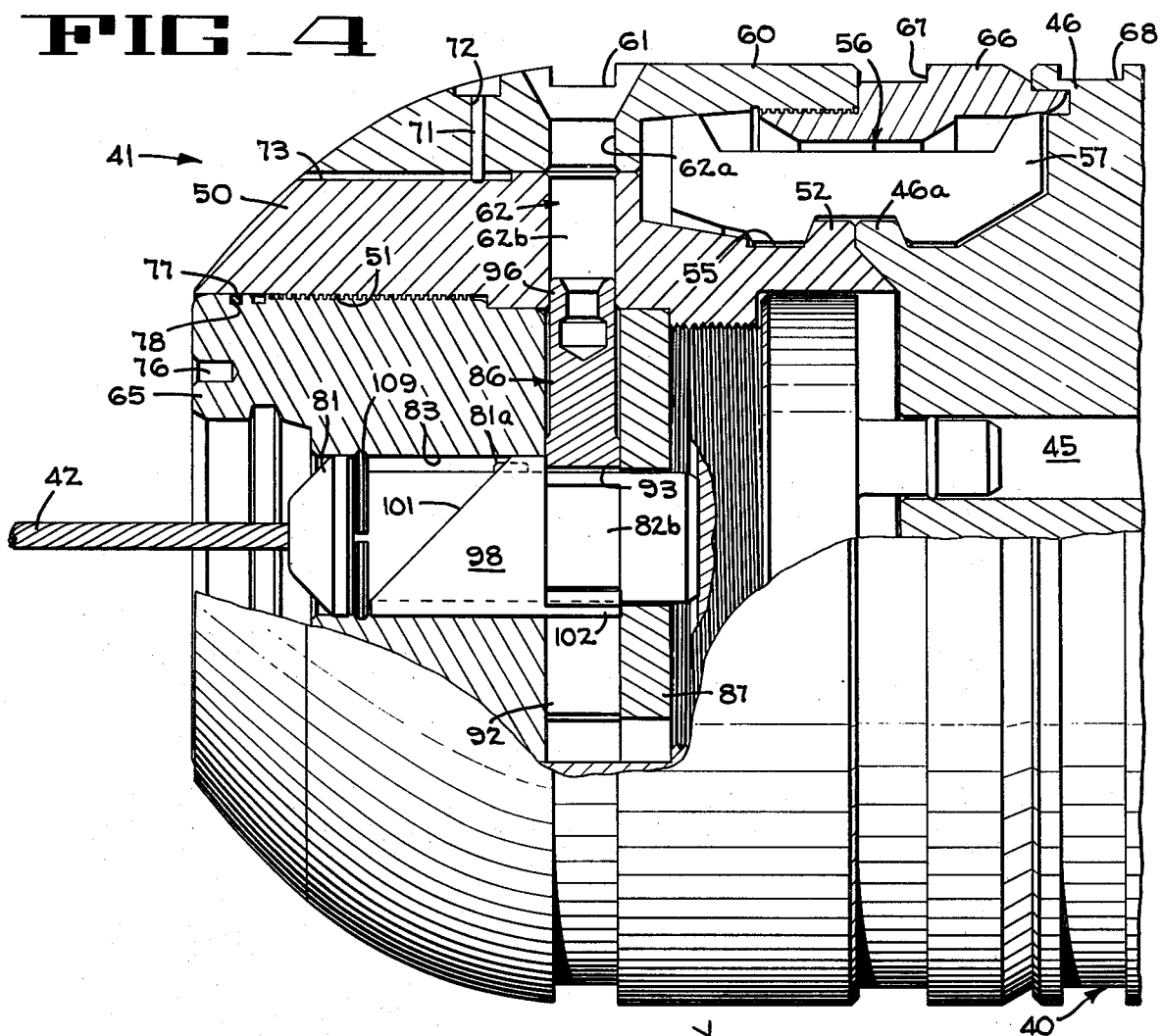
FIG_4
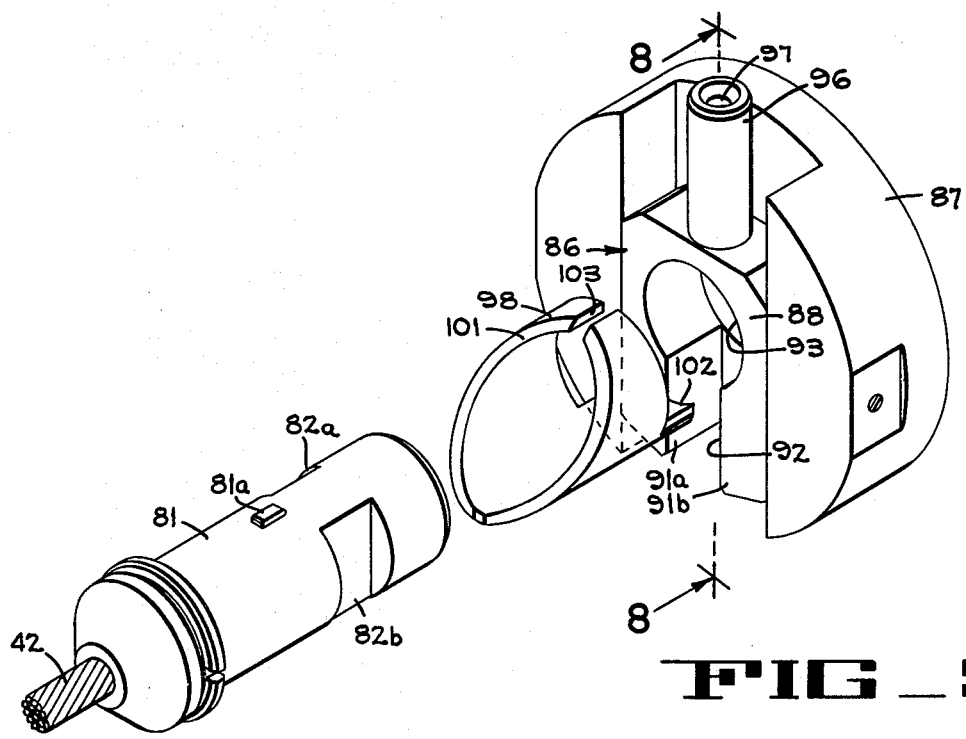
FIG_5

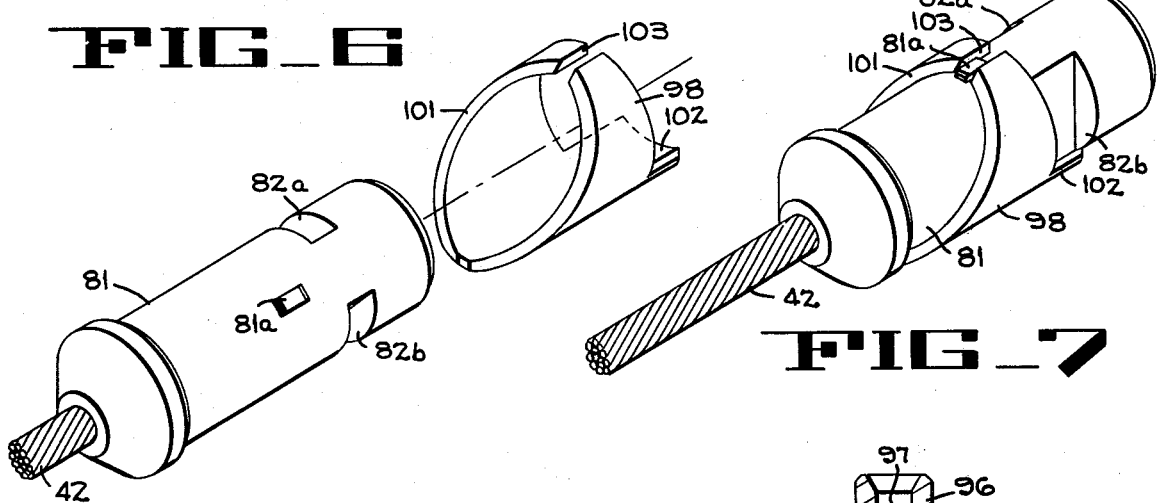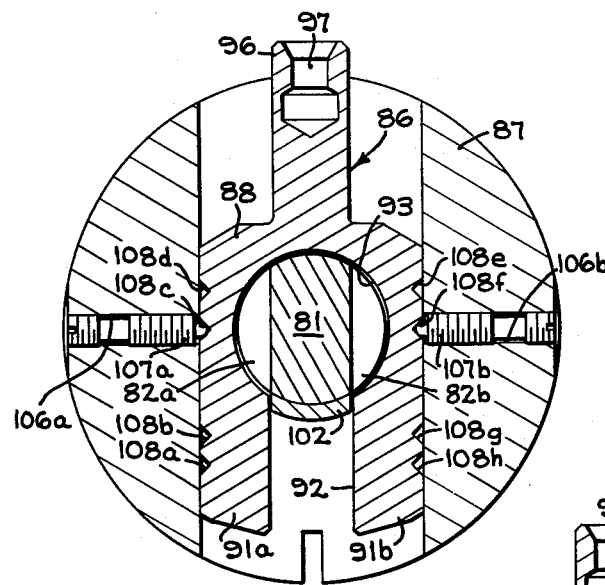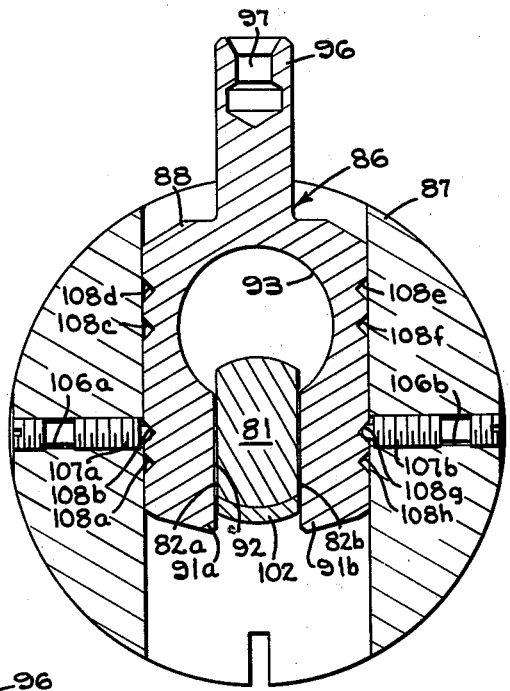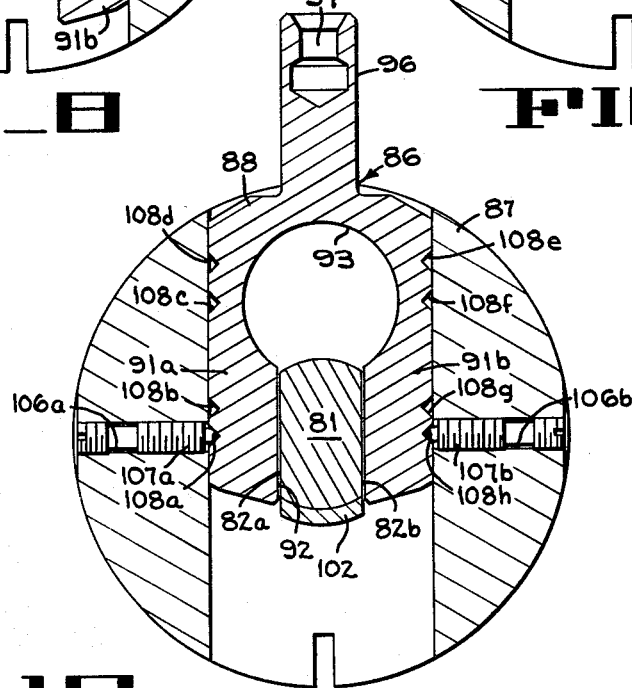

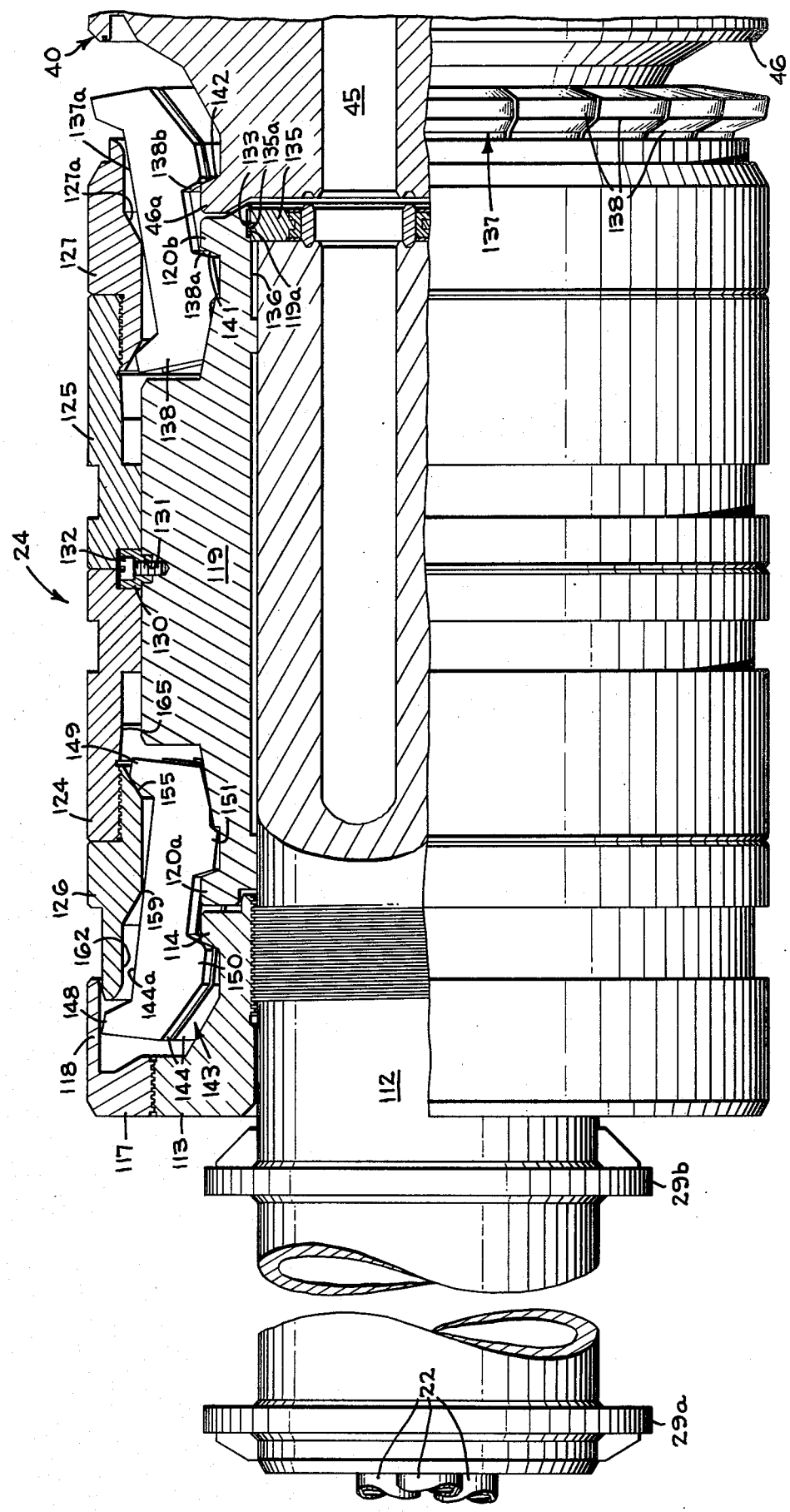
FIG_11

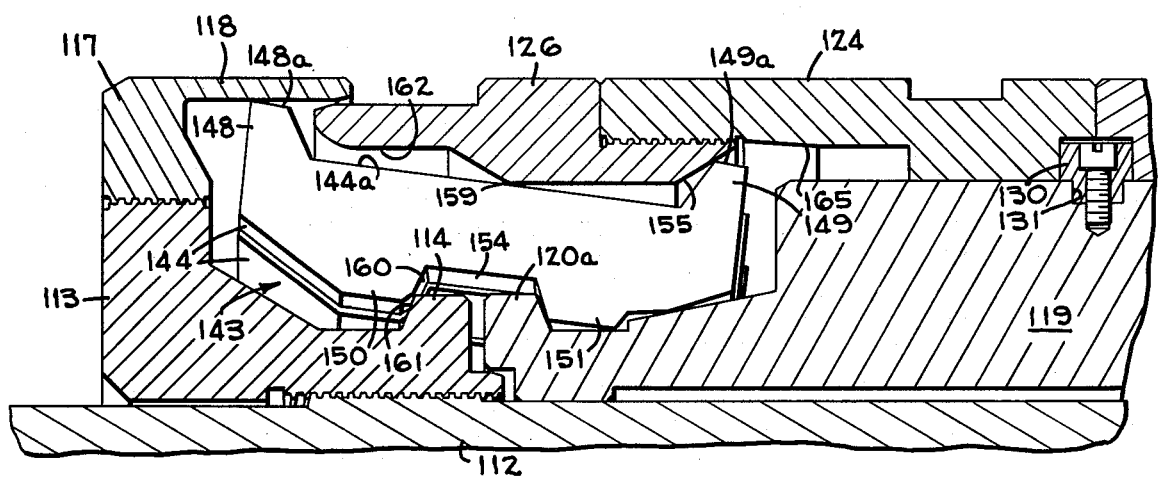
FIG_12
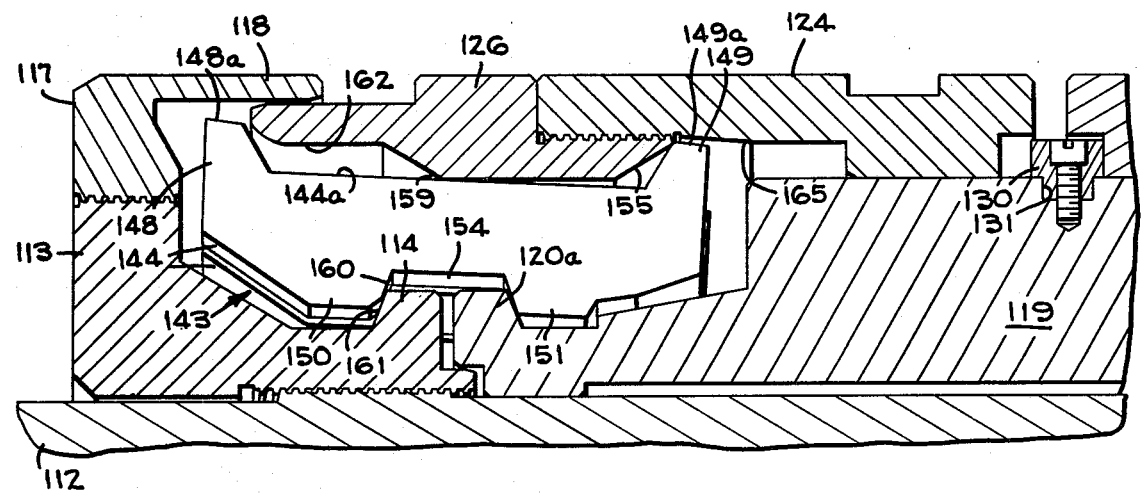
FIG_13

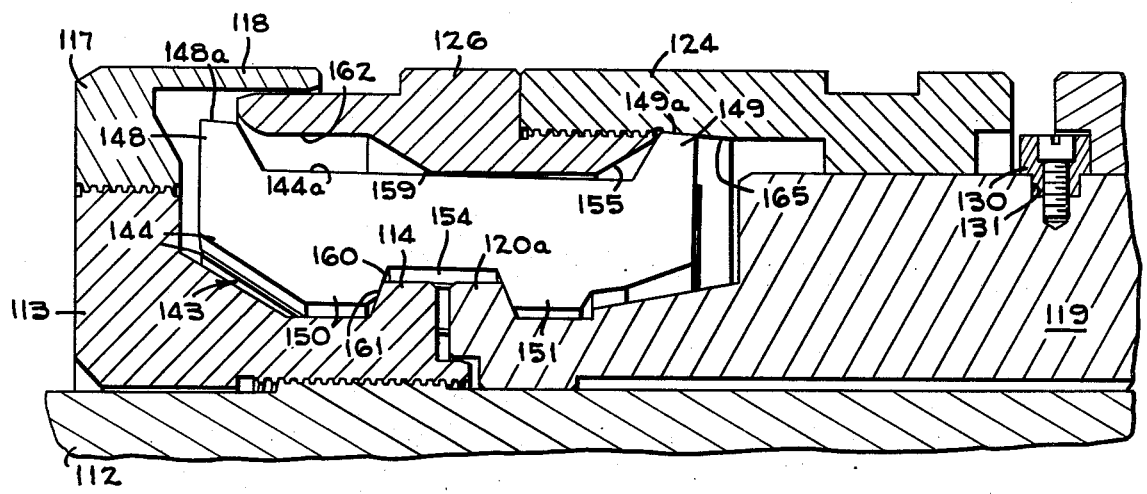
FIG_14
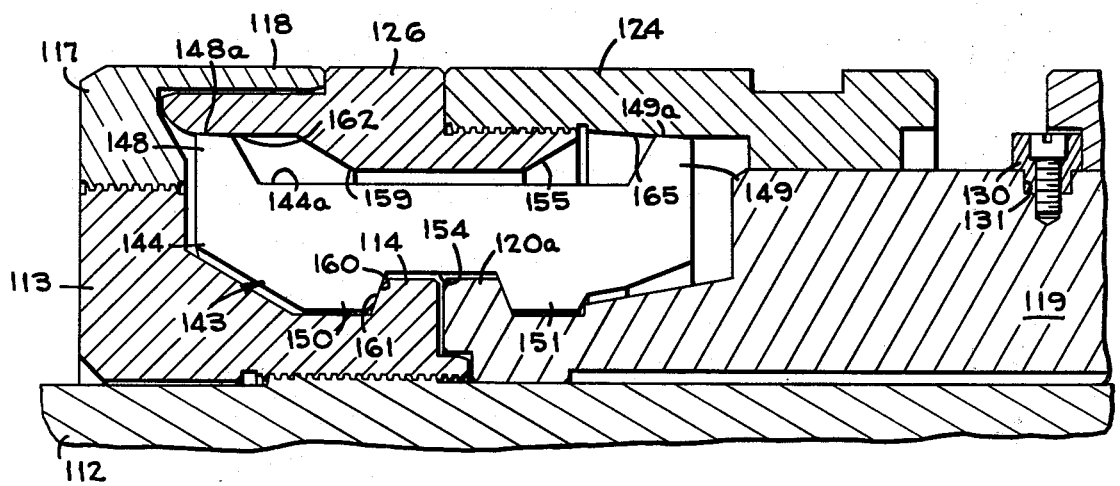
FIG_15

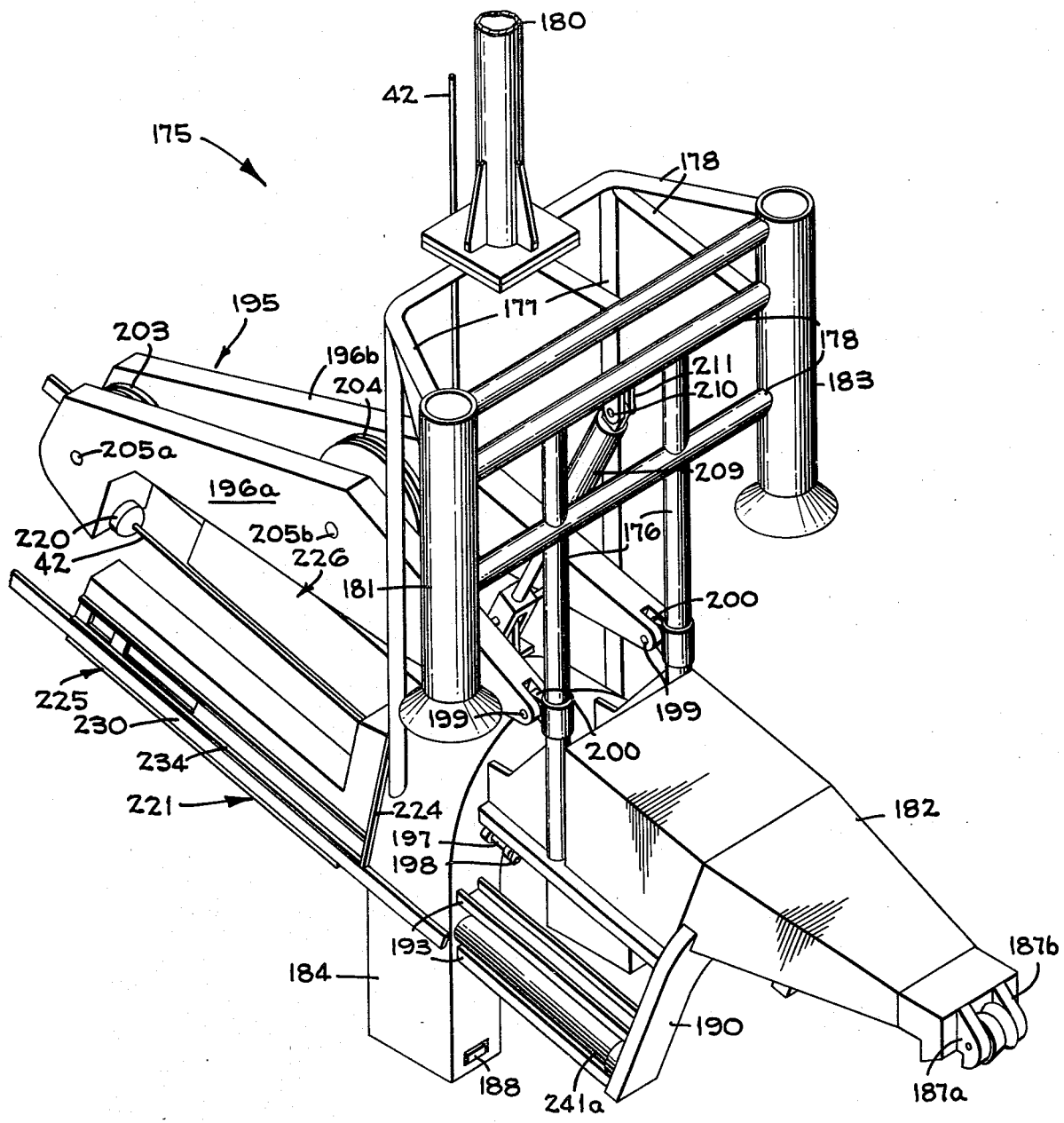
FIG_16

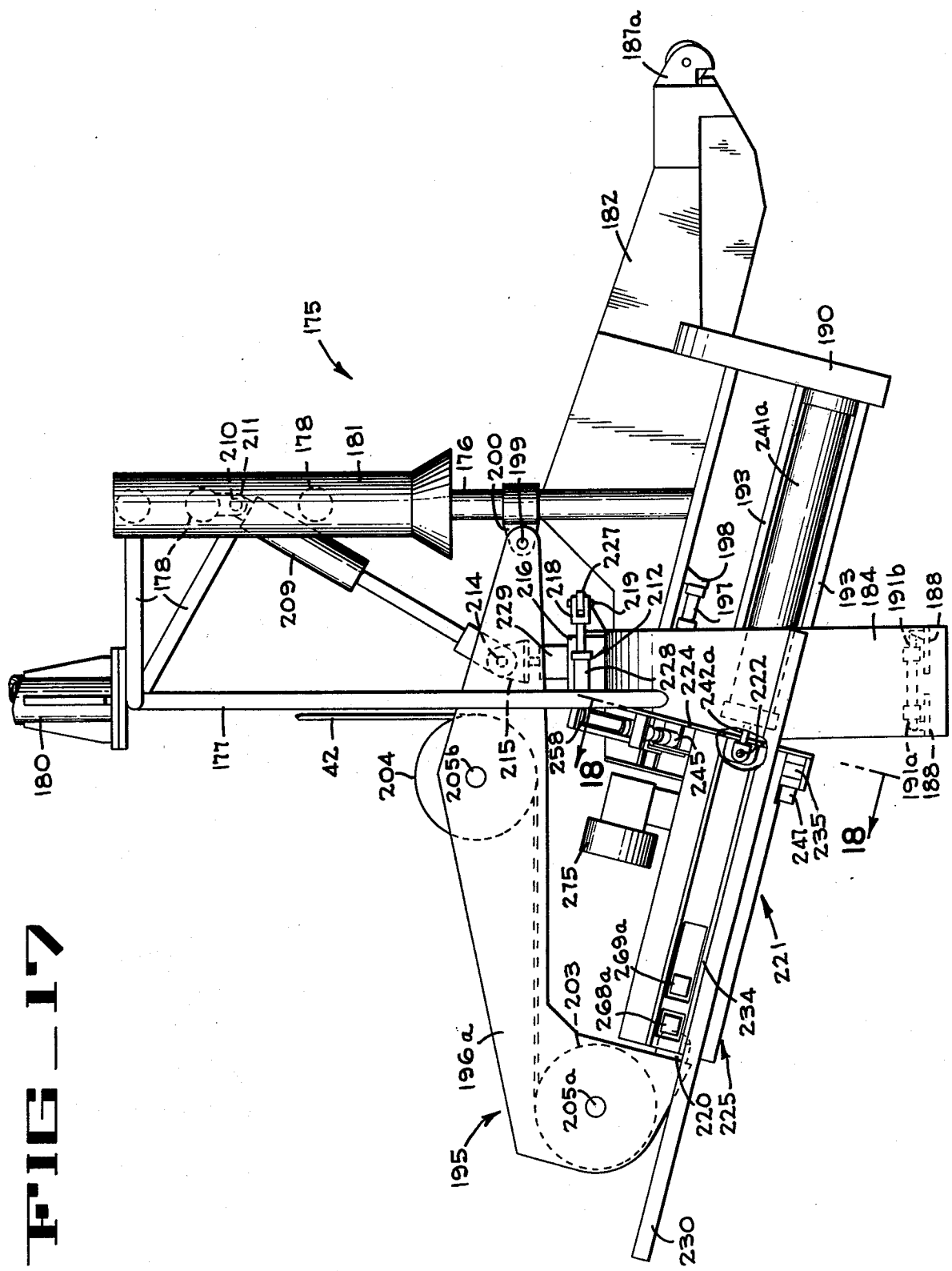

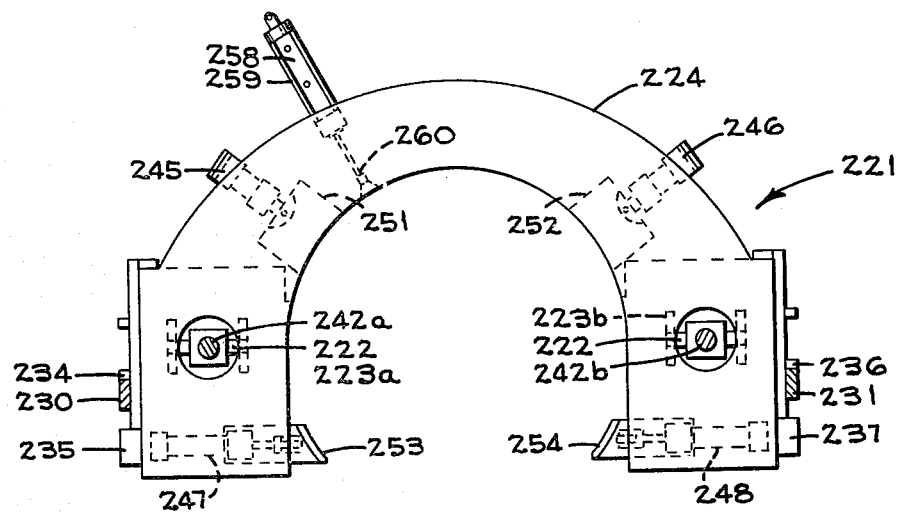
FIG_18
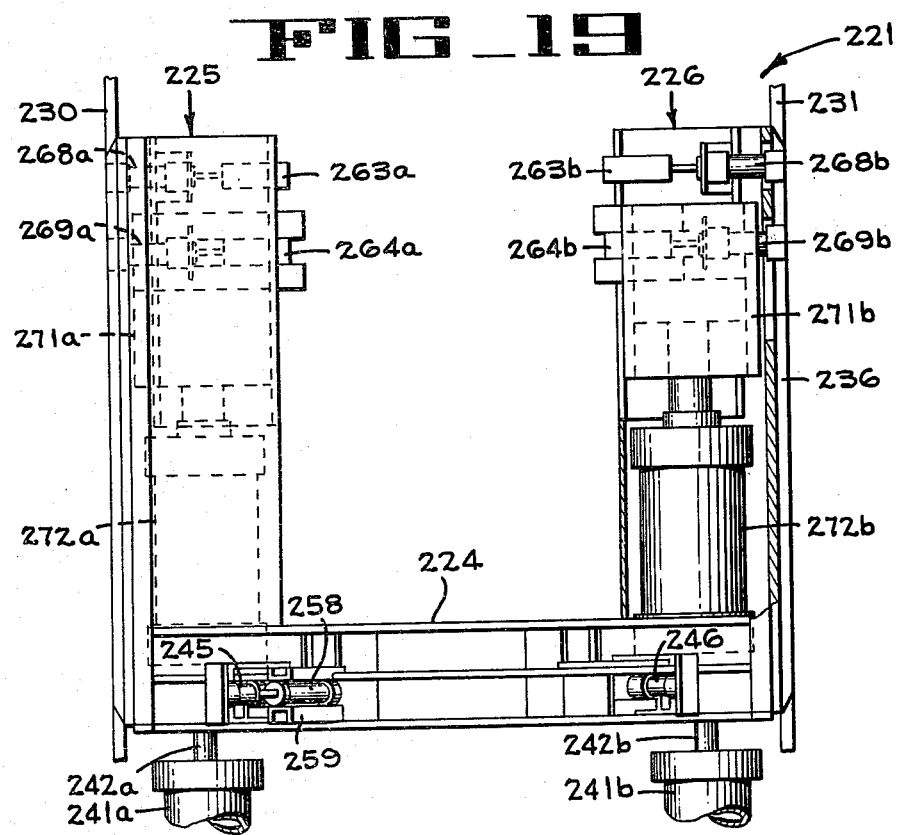
FIG_19

METHOD AND APPARATUS FOR COMPLETING DIVERLESS SUBSEA FLOWLINE CONNECTIONS

BACKGROUND OF THE INVENTION

1. Field of the Invention

This invention relates to subsea flowline connection systems and more particularly to a remote controlled system for precise alignment and connection of bundles of flowlines.

2. Description of the Prior Art

The production of oil and gas from offshore wells has developed into a major endeavor of the petroleum industry. Wells are commonly drilled several hundred or even several thousand feet below the surface of the ocean. These wells must not only be drilled without the use of divers at the deeper depths, but the connecting, testing and servicing of pipes and of regulating valves must be performed on these wells during and after the drilling process.

One of the major problems of subsea installation is the connecting of flowlines to transport the oil from the well after the well has been drilled and a subsea Christmas tree assembly has been lowered and fastened in place on the well. A plurality of short flowline loops are connected to the Christmas tree assembly before the tree assembly is lowered into place atop the well, with the free ends of the flowline loops gathered together and supported above the seafloor to facilitate connecting other flowline to the treeside flowline loops. Another plurality of flowlines has the first ends thereof connected to a storage container and the second ends thereof gathered into a bundle and lowered to the seafloor for connection to the flowline loops on the tree assembly. The flowline bundle is then pulled across the seafloor into alignment with the flowline loops so that the flowline bundle and the flowline loops can be connected together in a fluid-tight connection.

Some of the prior art flowline connecting facilities include a collar or flange connected around the flowline bundle and a pull-in cable attached to the flange at one side of the bundle. This collar and cable arrangement causes the ends of the flowlines to be pointed away from the axis of the ends of the flowline loops as the flowlines are moved toward the flowline loops. The flowlines on the side of the flowline bundle nearest the cable move slightly ahead of the other flowlines as the bundle is pulled across the seafloor. This results in uneven pressure around the seals when the flowlines and the flowline loops join and may cause these seals to fail. The axial orientation of the flowlines caused by collar and cable arrangement also increase the forces required to rotationally orient the flowlines and the flowline loops. Some of these problems would be reduced or eliminated if the cable were attached to the geometric center of the flowline bundle.

To solve the critical problem of obtaining exact alignment while the sealing members are being engaged, some of the prior art flowline connecting facilities use several "stages of alignment" with each of the subsequent stages of alignment absorbing and overcoming all of the forces needed to effect the previous stage of alignment plus the additional force needed to effect a more precise stage of alignment. As a result the components for each stage of alignment must be large enough to handle these large forces. Also the accumulation of all of the forces, including the forces needed to drag the flowline bundle into position initially are still present when the final precision sealing members are engaged.

What is needed is an apparatus which can pull the flowline bundle into a position adjacent the flowline loop and can provide the forces needed to hold the flowline bundle in place while another portion of the apparatus supplies a smaller force to precisely align the flowline loop with the flowline bundle and move the flowline loop into fluid-tight connection with the flowline bundle.

SUMMARY OF THE INVENTION

The present invention overcomes some of the disadvantages of the prior art by using remote-controlled apparatus employing a first connector mounted on the end of the flowline bundle and a second connector mounted on the end of the flowline loop. A pull-in cable is connected to the geometric center of the end of the first connector so that the flowline bundle can be pulled directly toward the second connector and clamped into axial alignment with the second connector with the two connectors adjacent each other. Means are provided for holding the first connector in an aligned position, for moving the second connector into a precise alignment with the first connector, and for clamping the two connectors together in a fluid-tight relationship. The two connectors are first pulled together in a precise alignment, the connectors are clamped so as to remain in this precision alignment and then the sealing members are set. This prevents damage to the sealing members as the connectors are moved into contact alignment.

BRIEF DESCRIPTION OF THE DRAWINGS

FIG. 1 is an isometric view of a diverless subsea flowline connection system according to the present invention illustrating the connecting apparatus.

FIG. 2 is an isometric view similar to FIG. 1 with the running tool in operating position.

FIG. 3 is a side elevation, with portions broken away, of the pulling head and one of the flowline connector elements.

FIG. 4 is an enlarged side elevation, with portions being broken away, of the pulling head.

FIG. 5 is an isometric view of a portion of the pulling head of FIG. 4.

FIGS. 6 and 7 are isometric views of a portion of the pulling head of FIG. 4 showing operation of this portion of the pulling head.

FIGS. 8–10 are sectional views taken along line 8—8 of FIG. 5 showing various operating positions of this portion of the pulling head.

FIG. 11 is an enlarged side elevation, with portions being broken away, of the flowline connector of FIG. 1.

FIGS. 12–15 are enlarged views of a portion of FIG. 11 showing a sequence of operation of the flowline connector.

FIG. 16 is an isometric view of the running tool which is used to connect the flowline connector elements.

FIG. 17 is a side elevation of the running tool of FIG. 16.

FIG. 18 is a section taken generally along line 18—18 of FIG. 17.

FIG. 19 is a plan view of the portion of the running tool of FIG. 17.

DESCRIPTION OF THE PREFERRED EMBODIMENT

A diverless flowline connector system of the present invention comprises a guidebase 11 (FIG. 1) having a plurality of guideposts 12 connected to the guidebase 11 with an ancillary guidebase 15 being welded or otherwise connected to the guidebase 11. A subsea Christmas tree assembly 17 includes a plurality of sleeves 18 which are each guided into working position on the guideposts 12 by one of a plurality of guidelines 19 as the assembly 17 is lowered to the seafloor. A first end (not shown) of each of a plurality of treeside flowlines 22 is connected to a Christmas tree 23. A second end of each of the treeside flowlines 22 is connected to a treeside flowline connector 24 with the flowlines each being in the form of a loop having sufficient radius so that conventional "through-flow-loop" tools (not shown) can pass through the flowlines. The flowline connector 24 is held in place by a retaining structure 26 which is connected at one end thereof to a sleeve 18 and is connected at the other end thereof to a cradle 27 having an annular sleeve 28 at one end thereof. The connector 24 is mounted inside the sleeve 28 so that a pair of flanges 29a, 29b limit the travel of the treeside connector 24 inside the sleeve 28. A shear pin 32 connected between the sleeve 28 and the connector 24 retains the connector 24 in a position with the flange 29b adjacent the sleeve 28 for reasons which will become apparent when the operation of the connector is described.

A pivot-over funnel assembly 33 (FIG. 1) having a landing base 34 and a pivot-over alignment funnel 35, is mounted on the ancillary guidebase 15. The landing base 34 can be connected to the ancillary guidebase 15 by a latching means (not shown) or it may be welded to the ancillary guidebase 15. The alignment funnel 35 having a slot 36 running along the length thereof, is mounted to the landing base 34 by a pair of pivot pins 37, only one of which is shown. The funnel assembly 33 can be lowered into working position on the seafloor and retrieved from the seafloor by a placement tool, or the funnel assembly may be attached to the ancillary guidebase 15 before the guidebase is lowered to the seafloor. This flexibility and the pivot-over feature of the funnel assembly allows the present invention to be used with a variety of flowline placement arrangements such as:

1. Allows the flowlines to be pulled into the funnel 35 from the seafloor.
2. Allows the flowlines to be pulled into the funnel 35 from a reel barge as the barge moves away.
3. Allows the flowlines to be lowered vertically to the seafloor while locked in the funnel which is retained in a vertical position. The funnel assembly is locked to the guidebase and the funnel is pivoted over as the flowlines are layed away.
4. Allows an operator to lower the guidebase, ancillary base and funnel assembly to the seafloor and decide at a later time how the flowlines are to be moved into the funnel.
5. Allows the pivot-over funnel assembly 33 and flowline bundle hub 40 (FIG. 2) to be retrieved from the seafloor if the flowlines should be damaged at a later time.

The alignment funnel 36 is positioned to guide a flowline bundle hub 40 (FIGS. 2 and 3) into axial alignment with the flowline connector 24 as the connector 24 and the bundle hub 40 are moved together by means to be described hereinafter. Attached to the left end of the bundle hub 40 is a protective seal test cap 41 (FIGS. 2-4) having a pull-in cable 42 (FIG. 2) connected to the geometric center of the protective seal test cap 41. The cable 42 is aligned along the same axis as the flowline bundle hub 40 and along the center of a plurality of flowlines 45 (FIG. 3) which are fixed to the bundle hub 40. Thus, the force exerted by the pull-in cable 42 is along the same axial line as the drag exerted by the flowlines 45 when the bundle hub 40 is pulled toward the flowline connector 24.

The flowline bundle hub 40 (FIG. 3) includes an annular body portion 46 having an annular flange 46a (FIGS. 3 and 11) at the left end thereof and having a plurality of flowlines 45, extending through the body 46. A pair of wedge-shaped keys 47a, 47b (FIGS. 2 and 3) each having a width just slightly smaller than the width of the funnel slot 36 (FIG. 1), are aligned along the length of the body portion 47.

The protective seal test cap 41 includes an annular body 50 (FIGS. 3 and 4) having a threaded bore 51 (FIG. 4) extending axially from the left end and having an annular flange 52 at the right end of the body 50. Adjacent the flange 52 is an annular groove 55 which is shaped to mate with a collet 56, having a plurality of locking dogs 57 extending around the right end of the protective seat test cap body 50. An annular actuation sleeve 60 (FIGS. 3 and 4) having a groove 61 near the midpoint and a bore 62 intersecting the groove 61, is slidably mounted around the body portion 50. A cable swage pin housing 65 is threaded to the bore 51 of the body 50. An annular actuation crown 66 (FIGS. 3 and 4) having an annular groove 67 near the middle is threaded to the right end of the actuation sleeve 60.

A pin 71 mounted in a radial bore 72 (FIG. 4) has the lower end thereof slidably positioned in an axial groove 73 to prevent the actuating sleeve 60 from rotating about the test cap body 50 to insure that the upper portion 62a of the axial bore 62 is aligned with the lower portion 62b when the cap 41 is locked on to the bundle hub 40. A plurality of bores 76 (only one of which is shown in FIG. 4) are spaced about the left end of the protective seal test cap to facilitate the use of a spanner wrench for assembly and disassembly of the cable swage pin housing 65 in the seal test cap 41. An "O"-ring 77 positioned in an annular groove 78 prevents leakage between the test cap body 50 and the cable swage pin housing 65.

A cylindrical cable swage pin 81 (FIGS. 4-7) having a key 81a projecting from the surface and having a pair of grooves 82a, 82b formed in the surface is secured in a bore 83 (FIG. 4) through the center of the swage pin housing 65 by a restrainment yoke 86 (FIGS. 4, 5 and 8-10) which is slidably positioned in a restrainment body 87. The restrainment yoke 86 (FIGS. 8-10) includes a generally U-shaped body section 88 having a pair of parallel legs 91a, 91b with a slot 92 between the legs. The slot enlarges into a circular bore 93 near the center of the body section. A cylindrical pin 96 (FIGS. 4, 5 and 8-10) having a bore 97 in the upper end thereof is welded or otherwise attached to the center of the U-shaped body section.

A generally annular alignment shoe 98 (FIGS. 4-7) having an inclined cam surface 101 (FIGS. 5-7) on the left end, a tongue 102 on the lower portion of the right end and a slot 103 along the length of the alignment shoe is mounted around the swage pin 81 (FIG. 4) with the tongue 102 positioned between the legs 91a, 91b of the yoke 86. The alignment shoe 98 is retained in the bore 83 of the test cap 41 by a snap ring 109 which fits in an annular groove 110. When the swage pin 81 is moved toward the right (FIGS. 5-7) into the alignment shoe 98 the key 81a rides up the cam surface 101 while rotating the swage pin 81 until the key is positioned in the slot 103 thus positioning the swage pin 81 so that the slots 82a, 82b are aligned with the legs 91a, 91b of the restrainment yoke 86 as shown in FIG. 8. The restrainment yoke 86 can then be raised to the position shown in FIG. 10 to lock the swage pin 81 to the yoke 86 and to the protective seal test cap 41 (FIG. 4). When the yoke 86 is raised into the locked position the pin 96 extends upward into the bore 62a (FIG. 4) to secure the actuation sleeve 60 in the position shown in FIG. 4 thus locking the protective seal test cap 41 securely to the bundle hub 40.

The restrainment body 87 (FIGS. 8-10) includes a pair of radial bores 106a, 106b each having a spring plunger 107a, 107b mounted therein. The radially inward ends of spring plungers are each biased into one of a plurality of slots 108a-108h to secure the yoke in one of four working positions. When the body section 88 is moved down so that the ends of the spring plungers 107a, 107b are in the slots 108d, 108e the restrainment yoke 86, the restrainment body 87, the alignment shoe 98 and the cable swage pin 81 can be inserted into or removed from the test cap 41 by screwing the cable swage pin housing 65 (FIG. 4) inside the test cap body 50.

When the ends of the spring plungers 107a, 107b are in the slots 108c, 108f (FIG. 8), the cable swage pin 81 is centered in the bore 93 so that the cable swage pin 81 and the pull-in cable 42 (FIG. 5) can be removed from the protective seal test cap 41, but the restrainment yoke 86 and the restrainment body 87 are retained inside the protective seal test cap 41. When the end of the spring plungers 107a, 107b are in the slots 108b, 108g (FIG. 9) the cable swage pin 81 and the pull-in cable 42 are locked to the seal test cap 41, but the actuation sleeve 60 (FIG. 4) can be moved to the left to release the protective seal test cap 41 from the bundle hub 40 (FIGS. 2 and 4). When the spring plungers 107a, 107b are in the slots 108a, 108h (FIG. 10) the pin 97 extends into the bore 62a (FIG. 4) to lock the seal test cap 41 to the bundle hub 40, as described above and lock the cable swage pin 81 to the protective seal test cap 41.

In order to lock the protective seal test cap 41 to the bundle hub 40 the cap 41 (FIG. 3) is moved to a position with the annular flange 52 adjacent the flange 46a of the bundle hub 40. The actuation sleeve 60 and the crown 66 are then moved to the right forcing the dogs 57 of the collet 56 downward over the flanges 52 and 46a thereby locking the cap 41 to the bundle hub 40 as shown in FIG. 4.

When the actuation sleeve 60 and the actuation crown 66 of the protective seal test cap 41 are moved to the position shown in FIG. 3, the dogs 57 are unlocked from the bundle hub 40 so that the protective seal test cap and the cable 42 can be disconnected from the bundle hub 40 and the flowline connector 24 (FIGS. 1, 2 and 11) can be connected to the bundle hub 40.

The flowline connector 24 (FIG. 11) includes a cylindrical body member 112 having the pair of spaced annular flanges 29a, 29b at the left portion of the body member. An annular ring 113 having a radial flange 114 at the right end thereof is threaded around the center portion of the body member 112 and an annular collet cap 117 having an axial flange 118 (FIGS. 11-15) is threaded about the left end of the annular ring 113. An annular body sleeve 119 (FIG. 11) having a radial flange 120a, 120b at either end is slidably mounted about the body member 112. Slidably mounted about the body sleeve 119 is a pair of annular actuation sleeves 124, 125 with each actuation sleeve being threaded to an annular actuation crown 126, 127. A retainer ring 130 is secured in an annular groove 131 in the center portion of the body sleeve 119 by a plurality of machine screws 132 (only one of which is shown in FIG. 11) to limit the axial travel of the actuation sleeves 124 and 125. An annular metal seal 135 is slidably mounted inside an axial bore 136 (FIG. 11) of the body sleeve 119 adjacent the right end of the body member 112. The seal 135 is retained in the bore 136 by an annular snap ring 133 mounted in an annular groove 135a in the seal 135 and by an annular groove 119a in the body sleeve 119. The ring 133 is fixed in the seal groove 135a but the ring 133 can be moved back and forth in the groove 119a by exerting a relatively small amount of pressure on the seal 135. When the ring is depressed by a tool (not shown) the seal 135 and the ring 133 can be removed from the right end of the connector 24 when the connector 24 is disconnected from the bundle hub 40, and a new seal 135 can be installed.

An annular collet 137 (FIG. 11) having a plurality of dogs 138 is mounted between the actuation crown 127 and the right end of the body sleeve 119. When the actuation sleeve 127 is moved to the right, an inner cam surface 127a on the sleeve 127 presses against an upper cam surface 137a on the dogs forcing the dogs 138 radially inward so that the cam surfaces 138a, 138b of the dogs move radially inward over the cam surfaces 141, 142 thereby forcing the flange 120b against the flange 46a of the bundle hub 40. This locks the right end of the flowline connector 24 securely to the left end of the bundle hub 40 in precise axial alignment without damage to the seal 135 as the seal 135 is recessed away from the right end of the body sleeve 119.

When the flowline connector 24 is placed in approximate alignment with the flowline bundle hub 40 with the connector flange 120b adjacent the bundle hub flange 46a, the first stage actuation crown 127 (FIG. 11) can be moved to the right to press the dogs 138 radially inward over the flange 46a on the flowline bundle hub 40. This action forces the flange 120b on the flowline connector against the flange 46a, on the bundle hub 40 thereby axially aligning the flowline connector 24 with the bundle hub 40 and locking the two connector elements securely together. The left end of the bundle hub 40 is still spaced from the sealing member 135 (FIG. 11) so that there is no damage to the sealing member 135.

An annular collet 143 (FIGS. 11-15) having a plurality of dogs 144 is mounted between the left end of the body sleeve 119 and the actuation crown 126. At either end of the dogs 144 is a radial outwardly extending flange 148, 149 (FIG. 15) having a cam surface 148a, 149a along the outer edge with each of the surfaces 148a, 149a sloping slightly inward from left to right. Along the radially inward portion of each dog is a pair of inwardly extending flanges 150, 151 having a groove 154 therebetween.

After the right end of the flowline connector 24 (FIG. 11) is securely clamped to the left end of the bundle hub 40 by the dogs 138, the annular seal 135 may be set by moving the dogs 144 through a series of operating steps shown sequentially in FIGS. 12-15. At the start of the seal setting operation (FIGS. 11 and 12) the flanges 114 and 120a are spaced a short distance and a sloping cam surface 155 (FIG. 12) on the actuation crown 126 presses inwardly against the top of the flange 149 thereby tilting the dogs 144 as shown in FIG. 12.

When the actuation sleeve 124 and the actuation crown 126 (FIG. 13) are moved to the left a cam surface 159 on the actuation crown 126 presses against a cam surface 144a on the dog 144 causing the center portion of the dog to move radially inward. The cam surface 155 has moved away from the dog flange 149 so the flange 149 is free to move upward to partly level the dog. The downward (FIG. 13) movement of the dog 144 causes a cam surface 160 on the dog to move over a cam surface 161 on the flange 114 thereby moving the flange 114 closer to the flange 120a, and moving the body member 112 toward the right. Moving the body member 112 toward the right also moves the annular seal 135 (FIG. 11) closer to the end of the bundle hub 40.

Moving the actuation sleeve 124 and the crown 126 further to the left (FIG. 14) causes a cam surface 162 on the actuation crown 126 to move over the cam surface 148a of the dog to force the dog 144 downward (FIGS. 14 and 15) over the flanges 114 and 120a. As the actuation crown 126 moves still further to the left IFIG. 15) the cam surface 162 slides over the surface 148a and a cam surface 165 on the actuation sleeve 124 slides over the cam surface 149a. The surfaces 162 and 165 are each sloped slightly so that the dog 144 is forced further down over the flanges 114 and 120a as the crown 126 and the sleeve 124 move to the left thereby drawing these flanges closer together (FIG. 16), moving the body member 112 further to the right and forcing the seal 135 tightly against the end surface 145 of the bundle hub 40. This provides a tight metal-to-metal seal between the flowline connector 24 and the bundle hub 40.

The funnel 35 which guides the flowline bundle hub 40 into alignment with the flowline connector 24, includes an enlarged bell portion 35a and an elongated cylindrical portion 35b (FIG. 1) with the slot 36 running along the length of the funnel. A mule shoe 166 mounted inside the funnel provides rotational alignment of the bundle hub 40 as the bundle hub is pulled into the funnel 35. The wedge-shaped key 47a (FIG. 2) contacts a cam surface 167 (FIG. 1) of the mule shoe as the bundle hub 40 is pulled into the funnel 35. As the bundle hub 40 moves further into the funnel the key 47a rides along the surface 167 which rotates the bundle hub 40 until the key 47a is guided into the slot 36 and pulled toward the left end (FIG. 1) of the funnel.

A pair of spring-loaded latching members 170, 171 are mounted in the cylindrical portion 35b (FIG. 1) of the funnel near the left end of the funnel 35. The latching members are each biased radially inward by springs (not shown). When the seal test cap 41 and the bundle hub 40 enter the cylindrical portion 35b of the funnel 35 the rounded front portion of the protective seal test cap moves against the latching members 170, 171 force them radially outward while the bundle hub continues toward the left end (FIG. 1) of the funnel 35. When the left end portion of the bundle hub 40 reaches the latching members they snap into an annular groove 181 (FIGS. 2 and 3) in the bundle hub and lock the bundle hub 40 in the funnel 35. The protective seal test cap 41 can then be removed, flowline connector 24 can be moved into position adjacent the bundle hub and the two connector elements 24, 40 can be locked together as described hereinbefore. The groove 181 and the latching members 170, 171 are considerably wider than the other grooves 61, 67 and 68 in the cap 41 and the hub 40 so that the latching members will not move into the wrong groove.

A running tool 175 (FIGS. 2, 16 and 17) performs a wide variety of functions, i.e., pulls the flowline bundle hub 40 into the funnel 35 to a position adjacent the flowline connector 24; removes the protective seal test cap 41, replaces the annular seal if necessary, connects the flowline connector 24 to the flowline bundle hub 40 and seals the connector elements 24 and 40 together in a fluid-tight relationship. The running tool contains all of the power operated devices for performing these operations and the running tool can be returned to the surface after the subsea connections are completed. Thus, none of the connectors which remain on the seafloor contain any power operated devices which could deteriorate while in the water.

The running tool 175 includes a frame having a plurality of vertical members 176, 177 (FIGS. 2, 16 and 17) interconnected to a plurality of cross-members 178. Several of the cross-members 178 are connected to a riser 180 which is used to transport the running tool to and from the seafloor. The running tool can also be lowered into working position by means of a cable connected to a surface support platform, such as a surface vessel. A pair of sleeves 181, 183 which are connected to the cross-members 178 of the frame direct the running tool down the guidelines 19 (FIG. 2) and guideposts 12, 12a into working position astride the funnel 35. A bridge 182 (FIGS. 2, 26 and 17) extending from the enlarged end 35a of the funnel to a point slightly beyond the cylindrical portion 35b of the funnel is connected to the vertical members 176 of the running tool. The bridge 182 includes a generally U-shaped base assembly 184 (FIGS. 16 and 17) with a pair of latching members 188 (only two of which are shown in FIG. 17) at either end of the U-shaped base assembly. The latching members each fit into a bracket 189 (FIG. 2) (only two of which are shown) which is welded or otherwise connected to the ancillary guidebase 15 to lock the running tool 175 into a working position atop the funnel 35. Each of the latching members 188 are moved into and out of a locked position by a hydraulic cylinder 191a, 191b (FIG. 17). A sheave is connected to the right end of the bridge 182 by a pin and a pair of ears 187a, 187b to aid in guiding the pull-in cable 42 (FIG. 2) into a working position inside the funnel 35. A generally semicircular yoke 190 (FIG. 2) which fits around the upper portion of the funnel 35 is attached to the base assembly 184 by a plurality of channel members 193. A hydraulic cylinder 197 (FIGS. 2, 16 and 17) provides means for unlocking the latching member 170 from the grooves 181, 181a (FIG. 3) in the bundle hub 40. The right end of the cylinder 197 is connected to an ear 198 which is welded or otherwise connected to the bridge 182. The left end of the hydraulic cylinder 197 includes linkage (not shown) which is connected to the latching member 170 (FIG. 1). Another hydraulic cylinder (not shown) is similarly connected to the latching member 171 (FIG. 1).

A sheave frame 195 (FIGS. 16 and 17) of the running tool 175 includes a pair of elongated members 196a, 196b each having one end thereof pivotally connected to one of the vertical members 176 by a pin 199 and an ear 200 with each of the ears 200 being welded or otherwise connected to one of the vertical members 176. A pair of sheaves 203, 204 (FIGS. 2, 16 and 17) are each mounted between the elongated members 196a, 196b by a pin 205a, 205b. The left end of the sheave frame 195 can be lifted away from the connector 24 by a hydraulic cylinder 209 which is connected between the elongated members 196a, 196b and a cross-member 178 by a pin 210 and clevis 211 (FIG. 17) on the upper end and a pin 214 and clevis 215 (FIG. 17) on the lower end, with the clevis 215 being welded or otherwise connected to the elongated members 195a, 195b. A stop 216 (FIG. 17) mounted on the base assembly 184 limits the downward travel of the sheave frame 195.

The sheave frame 195 is locked into the operating position shown in FIG. 17 by a locking device 212 which includes a clevis 218 and a pin 219 connected to an ear 227, with the ear being welded to the base assembly 184. A hydraulic cylinder 228 (FIG. 17) has one end thereof connected to the clevis 218 and the other end connected to a latch (not shown), which locks a bracket 229 and the sheave frame 195 in the operating position. The bracket 229 is connected to the clevis 215 of the sheave frame 195.

A yoke assembly 221 (FIGS. 2, and 16-19) which includes a generally U-shaped yoke 224 and a pair of arms 225, 226 (FIG. 19) is slidably connected to the base assembly 184 (FIG. 16) by a pair of support members 230, 231 (FIGS. 16-19) only one of which is shown in FIG. 16. The left end of each of the support members fits into a slot 217 (FIGS. 1 and 2) in the cradle 27 to provide support for the member. The arms 225, 226 are each connected at one end thereof to the yoke 224 and are slidably connected to the support rods 230, 231 by a plurality of flanges 234-237 which support and guide the yoke assembly 221. Power for moving the yoke assembly 221 relative to the base assembly 184 is provided by a pair of double acting hydraulic cylinders 241a, 241b (FIGS. 2, 16, 17 and 19). The hydraulic cylinders 241a, 241b are connected to the base assembly 184 and to the yoke 190, and the cylinder rods 242a, 242b (FIGS. 17-19) are each connected to the yoke portion 224 of the yoke assembly 221 by a pin 222 and a pair of ears 223a, 223b which are welded or otherwise connected to the yoke 224.

The yoke assembly 224 includes a plurality of hydraulic cylinders 245-248 (FIG. 18) connected between the yoke 224 and a plurality of locking dogs 251-254. The cylinders 245-248 move the dogs radially inward into grooves in the connector elements 24, 40 (FIG. 11) and in the protective text cap 41 (FIG. 4) to grasp these elements so that the running tool can manipulate these elements, i.e., connect, disconnect and move the elements. A hydraulic ram 258 connected to the yoke 224 by a bracket 259, includes a rod 260 which moves radially inward to press the cylindrical pin 96 (FIG. 4) of the test cap 41 radially inward and thereby release the test cap 41 from the bundle hub 46.

Each of the yoke assembly arms 225, 226 includes a pair of locking dogs 263a, 264a, 263b, 264b (FIG. 19) and a pair of hydraulic cylinders 268a, 269a, 268b, 269b connected between the arm and the corresponding locking dog. The cylinder 268b is connected to the dog 263b and fixed to the arm 226 while the cylinder 269b is connected between the dog 264b and a movable piston 271b. The piston 271b (FIG. 19) is powered by a hydraulic ram 272b connected between the piston 271b and the yoke 224, so that the piston 271b, the hydraulic cylinder 269b and the dog 264b move relative to the dog 263b. A piston 271a, hydraulic cylinder 272a and dog 264a are connected to the arm 225 in a similar manner. A seal changing tool 275 (FIG. 17) for removing and replacing the seal 135 in the connector 24 (FIG. 11) is connected to the running tool 175. Details of the structure of the changing tool 275 and of its operation are not considered critical to the present invention.

The sequence of operation to pull the bundle hub 40 into position adjacent the flowline connector 24 and to lock the two connecting elements together in a fluid-tight connection is as follows:

1. With the running tool 175 locked in operating position on the ancillary guidebase 15 (FIG. 2), with the sheave frame 195 lowered into working position and with the pull-in cable 42 attached to a winch (not shown) on a surface vessel (not shown) above the running tool, the bundle hub 40 is pulled into the funnel 35. The sheaves 203, 204, 185 (FIGS. 2 and 17) convert the vertical pull of the winch on the cable 42 into a substantially horizontal force on the bundle hub 40 and pull the bundle hub into the funnel 35. The bundle hub 40 is moved into the funnel 35 until the latching members 170, 171 (FIG. 1) on the funnel move into the groove 181 in the bundle hub (FIG. 3) to lock the bundle hub 40 in the funnel 35. Only grooves 181 and 181a are wide enough for the latching members 170, 171; the other grooves on the cap 41 and the hub 40 are too narrow. The seal cap 41 is now adjacent a stop 220 (FIG. 17) on the sheave frame 195 so the bundle hub 40 cannot be moved any closer to the flowline connector 24. The bundle hub 40 is now positioned with the groove 181 (FIG. 3) just inside the cylindrical portion 35b (FIG. 1) of the funnel 35 and with the narrow groove 68 just outside the end of the cylindrical portion of the funnel.

2. The hydraulic rams 241a, 241b (FIG. 16) are extended to move the yoke assembly toward the left (FIG. 2) and position the locking dogs 251-254 in the groove 61 (FIGS. 3 and 4) in the test cap 41.

3. The hydraulic ram 258 extends the rod 260 (FIG. 18) into the bore 41 (FIG. 4) thereby moving the cylindrical pin 96 (FIGS. 4, 5 and 8) and the restrainment yoke 86 into the cap unlocking position shown in FIG. 9.

4. The locking dogs 251-254 (FIG. 18) are retracted from the extended position out of the groove 61 (FIG. 4) and the yoke assembly 221 moved to the right (FIGS. 2 and 4) by the hydraulic rams 241a, 241b (FIG. 16) until the locking dogs 251-254 move into the groove 67 (FIG. 4).

5. The yoke assembly 221 is moved to the left (FIG. 2) with the dogs 251-254 causing the actuation sleeve 60 and the actuation crown 66 (FIG. 4) to move toward the left and unlocking the protective seal test cap 41 from the bundle hub 40. The yoke assembly 21 continues to move to the left thereby separating the protective seal test cap 41 from the bundle hub 40 and placing the cap 41 against the stop 220 (FIG. 17). The hydraulic cylinders 245-248 (FIG. 18) are retracted causing the locking dogs 251-254 to be released from the groove 67 and releasing the protective seal test cap 41. The cap 41 is retained against the stop 220 by the pull-in cable 42.

6. The hydraulic cylinder 209 (FIGS. 2 and 17) is energized to swing the left end of the sheave frame 195 upward moving the test cap 41 and the frame 195 away from the bundle hub 40 thus providing space to move the bundle hub 40 adjacent the flowline connector 24.

7. The hydraulic rams 241a, 241b (FIG. 16) are retracted to move the yoke assembly 221 toward the right (FIGS. 2 and 16) until the locking dogs 251-254 move into the groove 68 (FIG. 3) near the end of the bundle hub 40 to grasp and hold the bundle hub 40. The bundle hub 40 is unlocked from the funnel 35 by energizing the hydraulic cylinders 197 to release the latching members 170, 171 from the groove 181.

8. The hydraulic rams 241a, 241b (FIG. 16) are extended to move the yoke assembly 221 (FIG. 2) and the bundle hub 40 (FIGS. 2 and 3) toward a position with the left end of the hub 40 adjacent the right end of the flowline connector 24 (FIG. 2). This movement continues until the latching members 170, 171 move into the wide groove 181a and hold the bundle hub 40 securely in this position.

9. The locking dogs 251-254 are released from the groove 68 (FIG. 3) and hydraulic rams 241a, 24b (FIG. 2) are extended until the locking dogs 263a, 263b (FIG. 19) are adjacent the groove 121 (FIG. 11) in the connector 24. The dogs 263a, 263b are locked into the groove 121 by the hydraulic cylinders 268a, 268b and the hydraulic rams 241a, 241b are contracted to move the right end of the flowline connector 24 securely against the left end of the bundle hub 40 (FIG. 11).

10. The hydraulic cylinders 269a, 269b (FIG. 19) are extended and the hydraulic rams 272a, 272b extended until the dog 264a, 264b move into the groove 122 (FIG. 11) in the flowline connector 24. The hydraulic rams 241a, 241b remain contacted to secure the connector 24 against the bundle hub 40.

11. The hydraulic rams 272a, 272b (FIG. 19 are retracted to move the actuation sleeve 125 and the actuation crown 127 (FIG. 11) to the right, locking the flowline connector 24 securely to the bundle hub 40 as described hereinbefore and precisely aligning the right end of the flowline connector 24 against the left end of the bundle hub 40.

12. The hydraulic rams 272a, 272b (FIG. 19) continue to be retracted to hold the connector elements 24 and 40 together, while the hydraulic rams 241a, 241a, 241b are extended to move the locking dogs 263a 263, 263b (FIG. 19), the actuation sleeve 124 (the dogs 263a, 263b are still in the groove 121) and the actuation crown 116 toward the left (FIG. 11) to set the seal 135 as described hereinbefore.

13. The locking dogs 263a, 263b, 264a, 264b (FIG. 19) are removed from the grooves 121, 122 (FIG. 11), the running tool 175 (FIGS. 2 and 16) can be released from the ancillary base 15 by retracting the latching members 188 (FIG. 17) and the running tool can be pulled to the sea surface by the riser 182.

The present invention provides apparatus for moving two connector elements into precise axial alignment by securing a first connector element in a fixed position and pulling a second connector element toward the first by a cable connected to the geometric center of the end of the second connector element. The ends of the two connector elements are clamped in precise axial alignment and a sealing element which was recessed away from the end of the elements is forced against the ends of the elements to provide a fluid-tight connection.

Although the best mode contemplated for carrying out the present invention has been herein shown and described, it will be apparent that modification and variation may be made without departing from what is regarded to be the subject matter of the invention.

What is claimed is:

1. Remote-controlled apparatus for connecting a first connector, mounted on one end of a first flowline with a second connector mounted on one end of a second flowline and for securing the ends of the connectors in precise axial alignment without damage to seals used to interconnect the connectors, in a fluid-tight arrangement, said apparatus comprising:

a pull-in cable;
means for connecting said pull-in cable to the geometric center of the free end of said first connector;
means for moving said pull-in cable and said first connector into axial alignment with said second connector;
an annular seal;
means for mounting said seal adjacent the free end of one of said first and second connectors;
means for securing the ends of said first and said second connectors in precise axial alignment without pressing the ends of said connectors against said seal; and
means for pressing the ends of said first and said second connectors against said seal in a fluid-tight relationship after the connectors are secured in precise axial alignment.

2. Remote-controlled apparatus for connecting as defined in claim 1 including means for moving the free end of said first connector into axially aligned engagement with the free end of said second connector.

3. Remote-controlled flowline connection apparatus for completing flowline connections, said apparatus comprising:

a first connector mounted on one end of a first flowline;
a second connector mounted on one end of a second flowline;
a pull-in cable;
means for connecting said pull-in cable to the geometric center of said first flowline;
power means for moving said pull-in cable and said first connector toward said second connector;
a metal seal;
means for mounting said seal adjacent the free end of said second connector;
alignment means for guiding said first connector into axial alignment with said second connector as said first connector moves toward said second connector; and
means for clamping the ends of said first and said second connectors against said seal in a fluid-tight relationship.

4. Remote-controlled flowline connection apparatus as defined in claim 3 including means for securing said first connector in a fixed position after said first connector has been guided into axial alignment with said second connector.

5. Remote-controlled flowline connection apparatus as defined in claim 4 including means for disconnecting said pull-in cable after said first connector has been secured in a fixed position.

6. Remote-controlled flowling connection apparatus as defined in claim 5 including means for moving said second connector into axially aligned engagement with said first connector when said first connector is secured in said fixed position.

7. Remote-controlled flowline connection apparatus as defined in claim 6 including means for clamping said first and said second connectors in axially aligned engagement.

8. Remote-controlled flowline connection apparatus as defined in claim 7 including means for setting a fluid-tight seal between the end of said first and said second connectors after said first and second connectors have been clamped in axially aligned engagement.

9. Remote-controlled apparatus for connecting a first connector mounted on one end of a first flowline with a second connector mounted on one end of a second flowline, said apparatus comprising:
- a pull-in cable;
- means for connecting said pull-in cable to the geometric center of the free end of said first connector;
- means for mounting said second connector in a fixed position;
- power means for moving said pull-in cable and said first connector toward said second connector;
- a sealing member;
- means for mounting said sealing member adjacent the free end of one of said first and said second connectors;
- alignment means for guiding said first connector into axial alignment with said second connector as said first connector moves toward said second connector;
- means for clamping the free ends of said first and said second connectors in precise axial alignment; and
- means for pressing the ends of said first and said second connectors against said sealing member in a fluid-tight relationship.

10. Remote-controlled apparatus for connecting as defined in claim 9 wherein one of said first and said second connectors includes a recess adjacent the free end of said connector, said sealing member being stored in said recess until the free ends of said first and said second connectors are clamped together in precise axial alignment, and means for pressing said sealing member against the ends of said first and said second connectors to provide a fluid-tight seal.

11. Remote-controlled apparatus for connecting a first connector mounted on one end of a first flowline with a second connector mounted on one end of a second flowline, said apparatus comprising:
- a pull-in cable;
- a protective cap;
- means for mounting said protective cap over the free end of said first connector;
- means for mounting said second connector in a fixed position;
- an alignment funnel having a wide mouth portion and a narrower neck portion;
- means for mounting said funnel with the neck portion adjacent the free end of said second connector;
- means for moving said pull-in cable to pull said first connector into said funnel and align said first connector with said second connector;
- sealing means;
- means for removing said protective cap from the end of said first connector; and
- means for setting said sealing means in a fluid-tight engagement between the ends of said first and said second connectors.

12. Remote-controlled apparatus as defined in claim 11 including means for pivotally mounting said funnel adjacent the free end of said second connector.

13. A method of connecting a flowline bundle hub to a flowline connector in a fluid-tight arrangement while preventing damage to the seals used to complete the connection, said method comprising the steps of:
(1) mounting said seals on the end of said flowline connector,
(2) connecting a pull-in cable to the geometric center of the free end of said bundle hub,
(3) securing said flowline connector in a position with the free end of said flowline connector extending generally toward said bundle hub,
(4) pulling the geometric center of said bundle hub directly toward the geometric center of said flowline connector,
(5) securing the end of said bundle hub in precision alignment with the end of said flowline connector, and
(6) setting said seals in a fluid-tight engagement between the ends of said bundle hub and said flowline connector.

14. A method of connecting a flowline bundle hub to a flowline connector in a fluid-tight arrangement while preventing damage to the seals used to complete the connection, said method comprising the steps of:
(1) mounting said seals in a recessed cavity in one of said bundle hub and said flowline connector to prevent damage to said seals as said bundle hub and said flowline connector are moved together,
(2) connecting a pull-in cable to the geometric center of the free end of said bundle hub,
(3) retaining said flowline connector in a position with the free end of said flowline connector extending generally toward said bundle hub,
(4) pulling the free end of said bundle hub toward the free end of said flowline connector,
(5) guiding the free end of said bundle hub into axial alignment with the free end of said flowline connector,
(6) securing the end of said bundle hub in precision alignment with the end of said flowline connector, and
(7) moving said seals outward from said cavity into a fluid-tight engagement between the ends of said bundle hub and said flowline connector.

15. A method of remotely controlling the movement of a pair of subsea flowline connectors into a fluid-tight arrangement while preventing damage to the seals used to complete the connection, said method comprising the steps of:
(1) mounting said seals on the end of one of said flowline connectors,
(2) mounting a first connector in a fixed position relative to the seafloor,
(3) mounting a tapered guide means adjacent the free end of said first connector,
(4) connecting a pull-in cable to the geometric center of the free end of a second connector,
(5) pulling the free end of said second connector toward the free end of said first connector,
(6) guiding said free end of said second connector into axial alignment with said free end of said first connector,
(7) clamping the free end of said second connector to the free end of said first connector, and
(8) setting the seals in a fluid-tight engagement between the ends of said first and said second connectors.

16. Remote-controlled apparatus as defined in claim 11 wherein said alignment funnel includes a slot along the length of said funnel and wherein said apparatus includes means for moving said pull-in cable through said slot into the axial center of said funnel.

17. Remote-controlled apparatus for connecting a first connector mounted on one end of a first flowline with a second connector mounted on one end of a second flowline, said apparatus comprising:
- a pull-in cable;
- means for connecting said pull-in cable to the geometric center of the free end of said first connector;
- means for mounting said second connector in a fixed position;
- an alignment funnel having a slot along the length of said funnel;
- means for mounting said funnel with the small end of said funnel adjacent said second connector;
- means for moving said pull-in cable through said slot to position said pull-in cable inside said alignment funnel;
- means for moving said pull-in cable to pull said first connector into said funnel and align said first connector with said second connector; and
- means for connecting the end of said first connector to the end of said second connector.

18. Remote-controlled apparatus as defined in claim 18 wherein said means for moving said pull-in cable through said slot includes means for mounting said funnel in a generally horizontal position with said slot running along the top portion of said funnel, and means for lowering said pull-in cable through said slot.

19. A protective cap for sealing the ends of a plurality of flowlines in a flowline connector and for releasably connecting said connector to a pull-in cable, said cap comprising:
- a generally cylindrical body member;
- means for releasably securing said body member to the end of said flowline connector; and
- means for releasably connecting said pull-in cable to said protective cap.

20. A protective cap is defined in claim 19 wherein said means for releasably securing said body member to said flowline connector includes:
- an annular connector flange at the end of said flowline connector;
- an annular cap flange at the end of said protective cap;
- a plurality of locking dogs; and
- means for providing a radially inward pressure on both ends of each of said dogs to move said dogs astride both said connector flange and said cap flange to secure the end of said protective cap to the end of said flowline connector.

21. A protective cap as defined in claim 19 wherein said means for releasably connecting said pull-in cable includes means for remotely releasing and for remotely connecting said pull-in cable to said protective cap.

22. A protective cap as defined in claim 21 wherein said pull-in cable can be remotely connected and remotely disconnected from said protective cap while said protective cap is secured to said flowline connector.

23. A connector for connection to a cylindrical hub having an annular radial hub flange at the end of said hub, said connector comprising:
- a cylindrical body member;
- an annular body sleeve slidably surrounding a portion of said body member, said sleeve having a radial sleeve flange at each end thereof;
- a sealing member;
- means for mounting said sealing member on a first end of said body member;
- a plurality of connecting dogs mounted adjacent said sleeve flange at said first end of said body sleeve, each dog having first and second cam surfaces on the radially inward portion of said dogs;
- means for providing a radially inward pressure on both ends of each of said dogs to force said first cam surface against said radial hub flange and force said second cam surface against said radial sleeve flange at a first end of said body sleeve to secure said first end of said body sleeve in precise axial alignment against the end of said cylindrical hub; and
- means for moving said body member toward said cylindrical hub to compress said sealing member between the ends of said cylindrical hub and said body member after said body sleeve is in precise axial alignment with said cylindrical hub.

24. A connector as defined in claim 23 wherein said body member includes a radial body flange spaced from said first end of said body member, and wherein said means for moving said body member includes a plurality of sealing dogs mounted adjacent said radial body flange and said sleeve flange at a second end of said body sleeve and means for providing a radially inward pressure on both ends of said sealing dogs to move said sealing dogs against said body flange and against said second sleeve flange, said sealing dogs forcing said radial body flange toward said second sleeve flange.

25. A connector as defined in claim 23 including means for moving each of said dogs in a direct radially inward direction when a radial inward pressure is applied to the ends of said dogs.

26. A connector as defined in claim 23 wherein each of said dogs includes a cylindrical outer surface, means for positioning said cylindrical outer surface parallel to the axis of said body member prior to providing a radially inward pressure on the ends of said dogs, and means for retaining said outer surface in a position parallel to the axis of said body member as said dogs are moved radially inward.

27. A connector as defined in claim 23 including an actuation sleeve for providing said radially inward pressure on both ends of each of said dogs, said actuation sleeve including cylindrical inner surface means for pressing against the ends of said dogs to retain the dogs in a fixed position against said radial hub flange and against said radial sleeve flange when said dogs are at the extreme radial inward portion of their travel.

28. A connector as defined in claim 23 including an actuation sleeve for providing said radially inward pressure on both ends of said dogs, said actuation sleeve including means for pressing against the ends of said dogs to force said dogs radially inward as said actuation sleeve is moved axially parallel to the axis of said body member.

29. A connector as defined in claim 28 wherein said pressing means comprises a conical inner cam surface.

30. A connector as defined in claim 23 including an actuation sleeve for providing said radially inward pressure on both ends of said dogs, said actuation sleeve including conical inner cam surface means for pressing against the ends of said dogs to force said dogs radially inward as said actuation sleeve is moved parallel to the axis of said body member, said actuation sleeve including cylindrical inner surface means for pressing against the ends of said dogs to retain said dogs in a fixed position against said radial hub flange and against said radial sleeve flange when said dogs are at the extreme radial inward portion of their travel.

31. A method of remotely joining a pair of subsea flowline connectors into a fluid-tight arrangement, said method comprising the steps of:
   (1) forming a slot along the length of a tapered guide means,
   (2) mounting a first connector in a fixed position relative to the seafloor,
   (3) mounting said tapered guide means adjacent the free end of said first connector,
   (4) connecting a pull-in cable to the geometric center of the free end of a second connector,
   (5) lowering said pull-in cable and said free end of said second connector toward the seafloor,
   (6) guiding said pull-in cable through said slot and into the geometric center of said tapered guide means,
   (7) pulling the free end of said second connector toward the free end of said first connector,
   (8) guiding said free end of said second connector into axial alignment with said free end of said first connector, and
   (9) clamping said free end of said second connector to said free end of said first connector.

32. A method of remotely joining a pair of subsea flowline connectors into a fluid-tight arrangement, said method comprising the steps of:
   (1) mounting seals on the end of one of said flowline connectors,
   (2) forming a slot along the length of an alignment funnel,
   (3) mounting a first connector in a fixed position relative to the seafloor,
   (4) mounting said alignment funnel adjacent the free end of said first connectors,
   (5) connecting a pull-in cable to the geometric center of the free end of a second connector,
   (6) lowering said pull-in cable and said free end of said second connector to the seafloor,
   (7) guiding said pull-in cable through said slot into the geometric center of said alignment funnel,
   (8) pulling the free end of said second connector toward the free end of said first connector,
   (9) guiding said free end of said second connector into axial alignment with said free end of said first connector,
   (10) clamping said free end of said second connector to said free end of said first connector, and
   (11) setting the seals in a fluid-tight engagement between the ends of said first and said second connectors.

* * * * *

UNITED STATES PATENT AND TRADEMARK OFFICE
CERTIFICATE OF CORRECTION

PATENT NO. : 4,161,367

DATED : July 17, 1979

INVENTOR(S) : Glen H. Cuiper
Thomas J. Ames

It is certified that error appears in the above—identified patent and that said Letters Patent is hereby corrected as shown below:

Column 3, line 65; Change "36" to --35--
Column 8, line 32: Change "26" to --16--
Column 16, line 44: Change "retain the dogs" to --retain said dogs--

Signed and Sealed this

Nineteenth Day of May 1981

[SEAL]

*Attest:*

RENE D. TEGTMEYER

*Attesting Officer*     *Acting Commissioner of Patents and Trademarks*